United States Patent Office 3,321,367
Patented May 23, 1967

3,321,367
PARENTERAL COMPOSITIONS CONTAINING ANTIMONY (III) COMPLEX OF 2,3-DIMERCAPTO-SUCCINIC ACID
Walter Fuller, Neuallschwil, and Harro Stohler, Binningen, Switzerland, assignors to Hoffmann-La Roche Inc., Nutley, N.J., a corporation of New Jersey
No Drawing. Filed June 11, 1965, Ser. No. 463,361
Claims priority, application Switzerland, June 24, 1964, 8,269/64
3 Claims. (Cl. 167—55)

Antimony (III) complex compounds of 2,3-dimercapto-succinic acid and their salts are known to have a valuable chemoetherapeutic action. Aqueous injectable solutions of the sodium salt of the antimony (III) complex of 2,3-dimercapto-succinic acid have been successfully used for some time in the control of schistosomiasis. Such preparations are, however, associated with certain disadvantages which make their use difficult. In particular, upon the administration of such parenteral solutions undesirably high antimony blood levels set in for a limited time which are linked with determinental side effects such as sickness, vomiting, muscle pain and fever.

Further, such aqueous parenteral solutions are very unstable so that it is necessary to prepare the solutions only a short time prior to the administration. Longer storage, even under cooling, leads to decomposition, so that the preparations are unusable.

The instant diluent compositions eliminate all of the above disadvantages.

The compositions of the instant invention comprise the antimony (III) complex compound of 2,3-dimercapto-succinic acid suspended in a vegetable oil. There is obtained in this way a parenteral composition, the administration of which no longer results in the said undesirably high antimony blood levels and which, in comparison with the known compositions shows more constant blood levels that last longer. Moreover, it has been shown that, when using the compositions of the invention, the doses required for an effective treatment are substantially smaller than when using the known antimony dimercapto-succinic acid parenteral compositions.

Surprisingly, these advantages are due to the combination of the vegetable oil with the antimony complex compound of the free dimercapto-succinic acid. In the case of a suspension of the antimony complex of the sodium salt of dimercapto-succinic acid in oil, these advantages do not occur; nor do they occur in the case of an aqueous suspension of the antimony complex of the free acid or an aqueous solution of its sodium salt.

A further important advantage of the instant parenteral composition lies in its high stability and long storage capacity without decomposition of the active substance. This is of particular importance in tropical regions which form the main area of use of such preparations.

Olive oil is preferred as the vegetable oil. However, there can also be employed all other vegetable oils which are known to be suitable for use in parenteral formulations, such as arachis oil, maize oil, sesame oil and cotton seed oil.

The particle size of the antimony complex compound should be such that clogging of the needle of the syringe is avoided. Otherwise, the particle size of the antimony complex compound is not critical.

It has been found to be especially advantageous to use the antimony complex in an amount of about 1 to about 25 percent by weight, preferably in an amount of about 10 to about 20 percent by weight, based on the weight of the finished suspension.

On storing a preparation consisting of a suspension of the active material in vegetable oil prepared in accordance with the invention, occasionally the solid active material precipitates out from the suspension and forms at the bottom of the ampoule a clump which is dispersible only with difficulty. Naturally, this leads to complications on administration or makes the administration altogether impossible.

It has now been found that by the addition of benzyl alcohol there is obtained a suspension which is not so greatly inclined to precipitation of the active material or in which the precipitated active material can again be brought into suspension in a simple manner by short shaking. Therefore, according to a preferred embodiment of the invention, the antimony complex is suspended in the vegetable oil containing benzyl alcohol. The addition of benzyl alcohol brings about still a further advantage since this compound has a local anesthetic action. Thereby, the pains which often occur with and after the administration of oily suspensions are alleviated.

The benzyl alcohol is conveniently used in an amount of about 1 to about 5 percent by weight based on the weight of the finished suspension.

EXAMPLE 1

0.21 g. of p-hydroxybenzoic acid methyl ester and 0.09 g. of p-hydroxybenzoic acid propyl ester are dissolved at 100° C. in 90 g. of olive oil which has been deacidified and dehydrated, whereafter the solution obtained is sterilized for 3 hours at 140° C.

100 g. of meso 2,3-dimercapto-succinic acid antimony (III) complex (prepared according to Example 1 of U.S. Patent No. 2,880,222) are dissolved in 1 liter of ethanol. The solution obtained is filtered sterile. After the addition of 6 liters of sterile petroleum ether (boiling point 60–90° C.), about 90 g. of the complex compound purified in this manner crystallizes out. This complex compound is filtered off and dried.

10 g. of this complex compound are thereupon suspended while stirring under aseptic conditions in the solution of olive oil, p-hydroxybenzoic acid methyl ester and p-hydroxybenzoic acid propyl ester obtained according to the above procedure, whereafter the suspension obtained is filled under sterile conditions into ampoule flasks which are sealed, in the usual manner. Each finished ampoule contains 1 ml. of the suspension.

EXAMPLE 2

10 g. of the antimony (III) complex compound of meso 2,3-dimercapto-succinic acid, recrystallized according to the process of Example 1, are suspended by stirring under aseptic conditions in a sterile solution of 3 g. of benzyl alcohol, 90 g. of deacidified and anhydrous olive oil, 0.21 g. of p-hydroxybenzoic acid methyl ester and 0.09 g. of p-hydroxybenzoic acid propyl ester. The suspension is filled under sterile conditions into ampoule flasks which are sealed in the usual manner. Each completed ampoule contains 1 ml. of the suspension.

EXAMPLE 3

10 g. of the recrystallized antimony (III) complex of meso 2,3-dimercapto-succinic acid prepared in Example 1 is suspended in a sterile solution of 4.8 g. of benzyl alcohol, 85 g. of deacidified and dehydrated olive oil, 0.02 g. of p-hydroxybenzoic acid methyl ester, and 0.09 g. of p-hydroxybenzoic acid propyl ester with stirring under antiseptic conditions. The suspension is placed into ampoules containing 1 ml. of the suspension, under sterile conditions.

We claim:

1. A parenterally acceptable composition comprising a suspension of from about 1 to about 25 percent by weight, based on said composition, of the antimony (III) complex compound of 2,3-dimercapto-succinic acid in a vegetable oil.

2. A composition according to claim 1 wherein the vegetable oil is olive oil.

3. A composition according to claim 1 wherein from about 10 to about 20 percent of said complex compound is present.

References Cited by the Examiner

UNITED STATES PATENTS 3,105,793   10—1963   Lobel _____ 167—82

OTHER REFERENCES

Abdalla, A. Chem. Ab., volume 59 (1963).
Jordan, P. Chem. Ab., volume 59 (1963).
Remington's Practice of Pharmacy. Martin and Cook (1961), page 1010.
Wayne, Chem. Ab., volume 58 (1963).

ALBERT T. MEYERS, *Primary Examiner.*
STANLEY J. FRIEDMAN, *Assistant Examiner.*